April 1, 1930.                P. D. BREWSTER                1,752,477
                        CAMERA FOR COLOR CINEMATOGRAPHY
                    Original Filed March 14, 1921   2 Sheets-Sheet 1
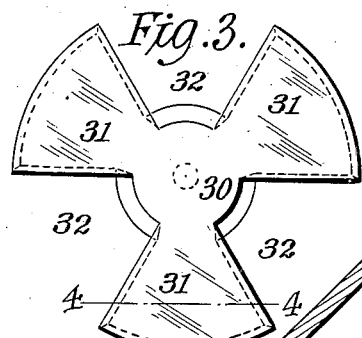
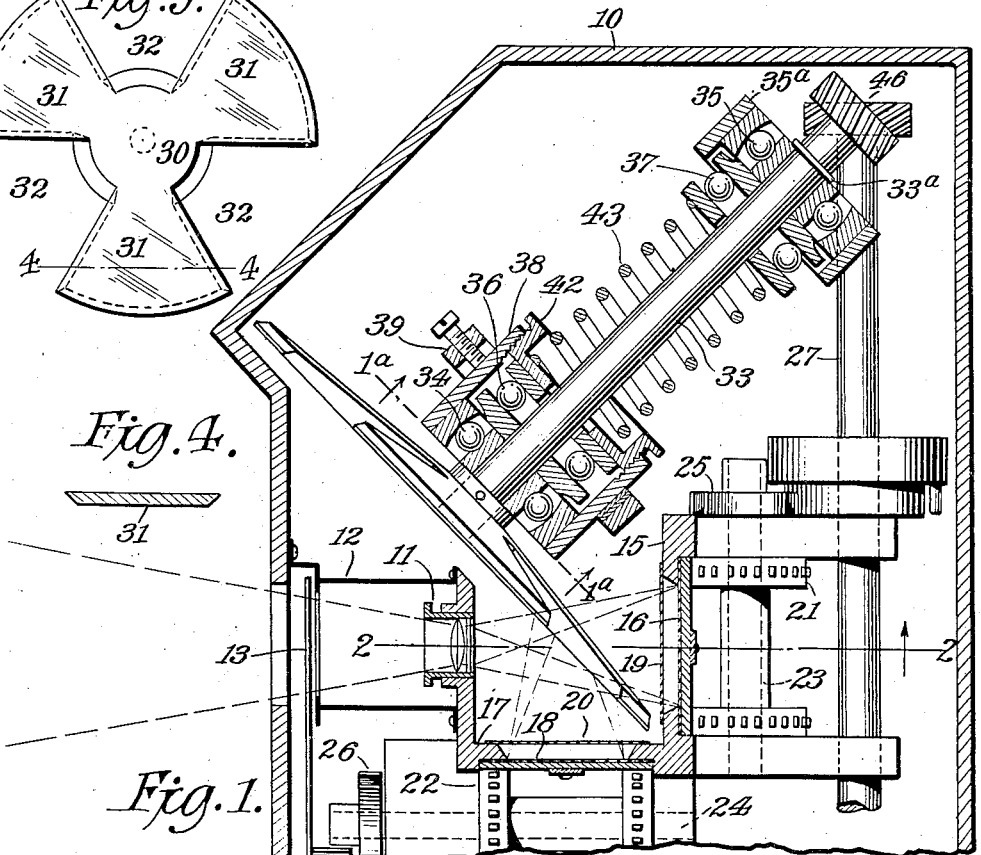
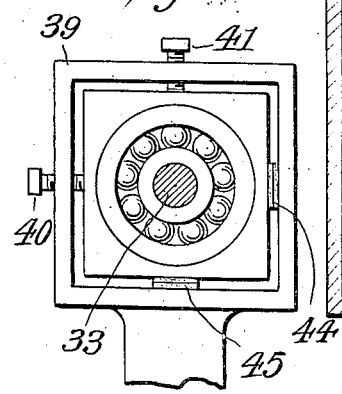

April 1, 1930.                P. D. BREWSTER                1,752,477
                      CAMERA FOR COLOR CINEMATOGRAPHY
                    Original Filed March 14, 1921    2 Sheets-Sheet 2
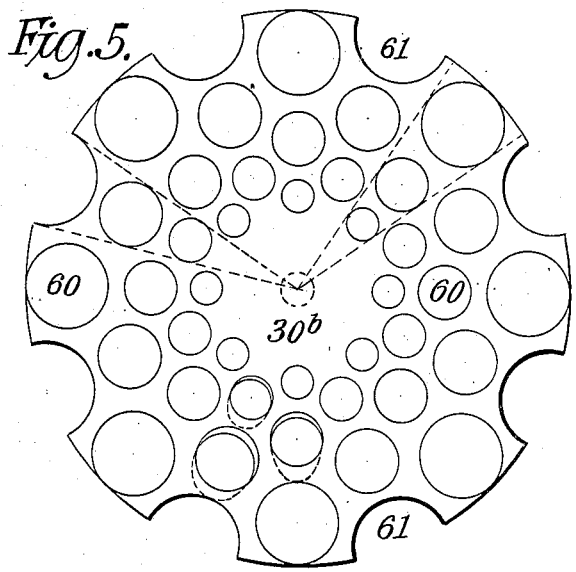
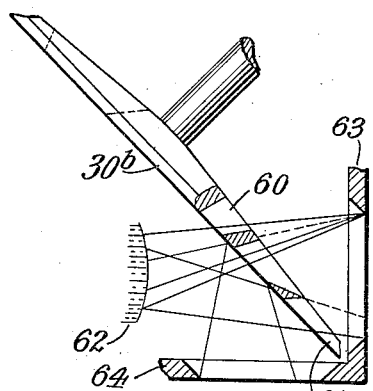
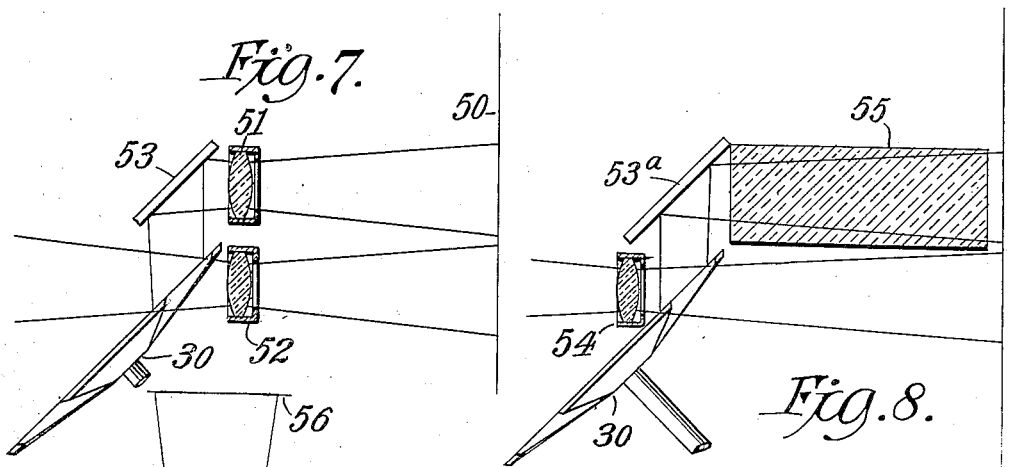
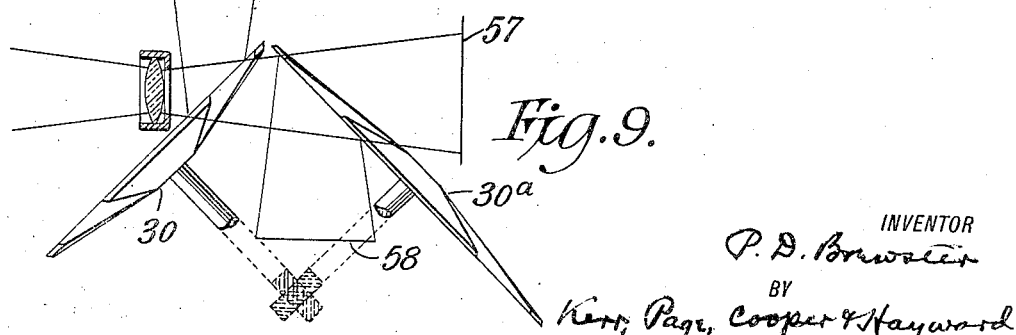

Patented Apr. 1, 1930

1,752,477

UNITED STATES PATENT OFFICE

PERCY D. BREWSTER, OF NEWARK, NEW JERSEY

CAMERA FOR COLOR CINEMATOGRAPHY

Application filed March 14, 1921, Serial No. 452,160. Renewed October 27, 1928.

In methods of making photographs in color, as for example color cinematography, in which two or more optical images are formed in the same exposure period to produce a corresponding number of color-value negative images of the object, the light received or transmitted by the optical projecting devices of the camera is divided by so-called light-splitting means and the several parts of the light are projected through color filters, usually red and green, upon different sensitive surfaces or upon different parts of the same sensitive surface. The latent images so produced are developed and fixed, thus yielding two or more series of color-value images which may be utilized in any suitable manner for printing positives, say upon opposite sides of a film sensitized on both sides.

The light-splitting devices usually employed in such methods require the light to pass through a considerable thickness of glass, which, for the best results, must be of the highest transparency and homogeneity, and must be figured and polished with extreme care, since imperfections in any of these respects will make themselves apparent on the screen, chiefly in the form of poor definition. Moreover, under the best possible conditions, glass, as is well known, has a scattering or analogous effect upon light rays with the result that in general it is difficult and sometimes impossible to secure in a color-value negative made through a glass light-splitting device the same sharpness of definition as can be obtained in so-called black-and-white work, in which a glass light-splitting device is not needed.

I have accordingly been led to devise my present invention, which has for its chief object to provide a splitting device in which the light is required to pass through only a thin plate of glass, at the most, and preferably through none at all. In its preferred form my improved splitting device takes the form of a plane mirror of circular shape, mounted to revolve or oscillate on an axis through its center and provided with a plurality of sector-shaped openings. The mirror is mounted behind or in front of the camera lens in a plane cutting the optical axis thereof at an angle, usually 45°, so that as the mirror revolves, the light will be reflected when a reflecting portion of the mirror is in the path of the rays and will be transmitted when one of the openings is in the path. The mirror may be made of any suitable material, as glass or metal, preferably the latter, in which case any metal convenient and suitable for the purpose can be employed, as for example speculum metal, silver, or brass or steel silvered on its front surface. Preferably, however, I use nickel unsilvered, as I find that it will take a sufficiently high polish for most purposes without silvering and that it possesses the rigidity necessary to prevent distortion under the stresses to which it is ordinarily subjected in the camera. Moreover, nickel can easily be rendered free of internal stresses or strains and hence can be accurately figured.

It is believed that the invention will find its chief utility in color cinematography, and accordingly it will be described hereinafter with special reference to that field, but it is to be understood that the invention is not limited in that respect.

In the accompanying drawings:

Fig. 1 is sectional plan view, somewhat diagrammatic, illustrating a motion picture camera embodying my invention in its preferred form.

Fig. 1$^a$ is a detail section on line 1$^a$—1$^a$ of Fig. 1, illustrating the adjustment of the revolving mirror vertically and horizontally.

Fig. 2 is a sectional side view, looking from the bottom of Fig. 1, on line 2—2 of the latter figure.

Fig. 3 is a front view of the revolving mirror.

Fig. 4 is a section of one of the reflecting sectors of the mirror on line 4—4 of Fig. 1.

Fig. 5 is a front view of a modified form of mirror, in which the light-transmitting apertures are circular instead of sector-shaped.

Fig. 6 is a diagrammatic sectional plan view illustrating the use of the mirror shown in Fig. 5.

Fig. 7 is a diagrammatic side view illustrating my revolving mirror employed in a two-lens camera of the type described in my copending application Serial No. 242,538, for making negatives of the so-called kinemacolor type, in which the two series of color-value negative images are in alternating sequence.

Fig. 8 is a view illustrating an arrangement similar to Fig. 7, but with a single lens, in front of the revolving mirror.

Fig. 9 is a diagrammatic plan view illustrating the invention applied to a three-color camera.

In the camera illustrated in Fig. 1, 10 indicates the usual light-tight casing or box. The lens 11 is protected by a hood 12, in front of which is a sector-shutter 13 which may be of the conventional type. As shown it is mounted on a shaft 14, driven by a crank (not shown) suitably connected thereto in any well known manner.

Immediately back of the lens 11 is a film gate 15 to support a film, as 16, in a plane at right angles to the optical axis of the lens, and at right angles to the film gate 15 is a second film gate 17, to support a film, as 18, in a plane parallel to the optical axis and perpendicular to the plane of film 16. Suitable color-filters are provided, as for example a red or orange-red filter 19 in front of film 16 and a green or blue-green filter 20 in front of film 18. Any suitable mechanism may be employed for feeding the films through the film gates simultaneously step-by-step (one picture-space at each step) as for example the conventional Geneva movement type of mechanism. The latter (omitting the upper sprockets provided to maintain the usual upper loops) include lower feed sprockets 21, 22 on shafts 23, 24 which are driven by Geneva movements 25, 26 from shafts 27 and 14 which are themselves connected together by any suitable gearing (not shown) so as to rotate in unison. It will be understood that the shutter, on shaft 14, is set to operate in harmony with the film-feeding devices, exposing the films while they are at rest and obscuring them while they are in motion through their film gates. It is deemed unnecessary to illustrate the film magazines, take up reels, etc., inasmuch as these and the other parts may be of the conventional character, well understood in the moving picture art.

The light-splitting mirror 30, shown in Figs. 1, 2 and 3, is in the form of a disk with sector-shaped reflecting portions 31 and intermediate openings 32 of the same shape. Preferably the mirror is made of solid nickel, with its front reflecting surface or surfaces accurately figured to an optical plane and highly polished. It is fixed firmly on a shaft 33, mounted in running bearings 34, 35, of the ball type, with ball thrust-bearings 36, 37. The outer race of bearing 35 is mounted in any convenient and suitable manner (not shown) upon a stationary part of the apparatus, and the outer race of the front bearing 34 may be mounted in a fixed or adjustable support 38. Preferably the latter is mounted in a fixed or adjustable carrier 39, provided with vertical and horizontal adjusting screws 40, 41, bearing on the support 38. The rear of the collar or carrier 38 has a threaded cup 42 to receive the forward end of spring 43, encircling the shaft, and the rear end of the spring bears on the rear thrust-bearing, which in turn bears on the inner races of the running bearings.

As indicated in Fig. 1, the splitting mirror extends edgewise into the space behind the lens, at an angle to the optical axis thereof. It is in general important that the reflecting plane of the mirror be so positioned that the reflected axial ray will strike the film at right angles. In practise I prefer to construct and position the parts as accurately as possible, and then make a final adjustment by means of the screws 40, 41, and shims 44, 45, opposite the same, by which the shaft 33 can be swung laterally and vertically within sufficient limits to compensate for inaccuracies of the construction, etc. In this adjustment the shaft swings on a center which is coincident with the center of curvature of the spherical inner surface of the outer race. Since this point is remote from the front bearing, a very minute amount of shake or backlash in the gears permits a substantial movement of the mirror.

The outer races of the running bearings have a snug sliding fit in the collars 38 and 35$^a$, and the inner race of the rear bearing rests against a collar 33$^a$ on shaft 33. The carrier 39 is axially stationary. Hence screwing the cup 42 into the carrier 39 shifts the shaft 33 and all the bearings forwardly in the collars 38, 35$^a$, and backing the cup out permits the shaft and bearings to be pulled or pushed backwardly.

The mirror shaft 33 is driven from shaft 27 by gearing 46. As shown in Fig. 1, the ratio of the gearing is such that the mirror will be rotated at least once in each revolution of the shaft 27. Further (see also Fig. 2) the Maltese crosses 25, 26, are actuated to feed the films one step in each revolution of shafts 14, 33, which, as stated hereinbefore, are connected by gearing (not shown) to rotate in unison. Hence in each cycle of operation of the camera, i. e., from the beginning of one film feeding operation to the beginning of the next, the mirror will rotate at least one complete revolution, thus giving with the three bladed mirror shown, a plurality of transmissions and a plurality of reflections in each period of exposure. Two revolutions in each cycle, obtained by the employment of suitable gearing at 46, give a correspondingly greater number of transmissions and reflections in each cycle, but it is to be understood that the speed of revolution of the mirror may be greater or less without departing from the spirit of my invention. Better results are obtained, however, with a mirror speed sufficient to give several transmissions and reflections in each exposure period.

The straight and curved edges of the reflecting portions of the mirror are preferably beveled to a knife edge, as indicated in Fig. 4, so that there will be no sensible reflection except from the front surface of the mirror.

In Fig. 7 one film, 50, is used, with two lenses, 51, 52, to produce separated or displaced images of different color-values on the same film, as in my copending application Serial No. 242,538. In lieu of the splitting prism described in that application, I employ in Fig. 7 my improved splitting mirror 30, arranged at an angle in front of one of the lenses, say the lower, and a stationary mirror, 53, in front of the other. When, as the mirror 30 revolves, an aperture is in front of the lens 52, light from the object passes directly to the lens and forms an image on the film, but when a reflecting portion of the mirror is in front of the lens, light is reflected to the upper mirror, 53, and thence to the upper lens, to form another image on the film. Of course suitable color-filters, not shown, are provided in the paths of the rays to give the proper color values, as for example a red and green.

In Fig. 8 a single lens, 54, is used, with mirrors 30 and 53ª behind the lens. The path of the reflected rays from the lens to the film is longer than the path of the transmitted rays by the distance between the images, center to center, and hence one or both images would be more or less out of focus, with consequent loss of definition. To improve this condition, a block of glass, as 55, may be placed in the path of the reflected rays between the film and the upper mirror, which, in effect, as is well understood, shortens the path. In other respects the method is the same as that illustrated in Fig. 7.

Fig. 9 shows an arrangement for three-color work, three films, 56, 57, 58, and two splitting mirrors, 30, 30ª, being used. In this case the mirrors are so related as to speed of rotation, or size of their transmitting apertures, or both, that when mirror 30 is transmitting light the transmission must continue long enough for mirror 30ª to reflect light to film 58 and also transmit light to film 57. Color filters (not shown) are of course used, say red, green and blue.

Fig. 5 shows a splitting mirror 30ᵇ, in which the transmitting apertures are in the form of holes and peripheral notches, preferably circular, as 60, 61. Fig. 6 illustrates the mirror arranged for use, between the lens 62 and the film gates 63, 64. The edges of the openings are preferably flared rearwardly to conform as nearly as possible to the cones of rays projected by the lens, and may be painted optical black to eliminate undesired reflections. I prefer to have the openings decrease in size from the periphery inwardly, and to have their centers in radial alignment, thus securing to some extent at least the effect of sector-shaped openings, as indicated by the dotted lines.

It will be understood that in the arrangements illustrated in Figs. 6, 7, 8 and 9 the other necessary devices are assumed, such as the usual light-tight casing, film magazines, shutters, film-feeding mechanisms, color-filters, etc., but for the sake of brevity they are not shown.

The amount of light received by the respective image-areas on the film or films depends chiefly upon the relative extent of the reflecting and transmitting portions of the mirror and upon the efficiency of the reflecting surface. In general, films are more sensitive to blue and green than to red light, and hence I prefer to subject the green-sensitive film (in such constructions as are illustrated in Figs. 1, 6, 7 and 8) and the green and blue-sensitive films in Fig. 9, to the reflected rays. In designing a mirror for actual use the two factors mentioned, and the relative sensitiveness of the films, should be kept in mind, so that each film may receive the amount of light necessary to produce images of the desired densities. In principle it is possible to compensate for inaccurate design or for reflection losses, by periodic variation of the speed of the mirror, so as, for example, to keep the reflecting portions in operative position for a longer time than the transmitting portions, but this method introduces undesirable mechanical complications. The color filters should also be taken into consideration in some cases, since they sometimes vary greatly in respect to the amount of light that they will pass. Thus there is usually a greater loss of green light in a green filter than of red light in a red filter. Hence the filters may aid in attaining the desired light-ratio; as for example, if the reds are persistently over-exposed, a filter which will pass less light may be used, or a more efficient green filter may be used. A person skilled in the art can, in applying my invention in practise, take all the above points into consideration, and by proper variation of one or more can secure the results desired.

To make it possible to attain the utmost accuracy of registry of the images in subsequent printing on the two sides of a positive film, the negative film or films may be positioned in the camera, and in the printing machine, by means of registry pins as in my Patent No. 1,359,025, issued November 16, 1920.

After the positive film is developed and fixed it can be dyed, say green on one side and red on the other, by any suitable method, as for example by the method described in the patent of Hoyt Miller, No. 1,214,940, issued February 6, 1917. If the film is sensitized only on one side, one series of negative images is printed thereon, then developed, fixed, and dyed, after which the dyed images are protected by an impervious coating, as by means of a celluloid varnish. The film can then be re-sensitized, over the impervious coating, to receive the second series of negative images, which can be developed, fixed, and dyed without affecting the first series of positive images. In the same manner a third series (as in three-color work) can be printed on the film, or on a film which bears images on both sides.

It is to be understood that the invention is not limited to the specific constructions and methods of procedure herein specifically described, but can be practised in other ways without departure from its spirit. In referring to the operation of the revolving mirror in the appended claims I use the terms "transmit" and "transmission" in the sense of passage of light through the opening or openings in the mirror as distinguished from transmission by a transparent medium.

I claim:

1. In a color camera, the combination with a lens, a film-gate in rear of the lens to support a negative film in position for exposure, a plane mirror extending between the lens and said film-gate and occupying a plane at an angle to the axis of the lens, said mirror having at least one light-passing opening, means for revolving the mirror in its own plane, a film-gate arranged to support a negative film in position to receive light reflected by the mirror, means for feeding films through the film-gates simultaneously step-by-step, a shutter for exposing both films at each period of rest thereof, and means for actuating the mirror, the shutter, and the film-feeding means in harmony with each other.

2. In a color camera, the combination of a lens, a film-gate in rear of the lens to support a negative film in position for exposure, a plane mirror extending between the lens and said film-gate and occupying a plane at an angle to the axis of the lens, said mirror having at least one sector-shaped light-passing opening, means for revolving the mirror in its own plane whereby light from the lens passes to the aforesaid film-gate and is reflected laterally, in alternation, a film-gate arranged to support a negative film in position to receive the laterally reflected light, mechanism for feeding films through the film-gates simultaneously step-by-step, a shutter for exposing both films at each period of rest thereof, and means for actuating the mirror, the shutter, and the film-feeding mechanism in harmony with each other.

3. In a color cinematographic camera, a lens; a plane mirror extending into the path of light rays transmitted by the lens and occupying a plane at an angle to the axis of said lens, said mirror having at least one light-passing opening; film gates arranged to support negative films, one in position for exposure to light rays reflected by the mirror and another in position for exposure to light rays transmitted by the mirror; color filters for the films; a shutter adapted to permit light from the lens to reach both said films at each period of rest and while both are simultaneously at rest; means for revolving the mirror in its own plane whereby light rays from the lens are alternately reflected and transmitted by the mirror; means for actuating the mirror revolving means and the shutter; and means for feeding the films through the film gates step by step while the shutter is closed.

4. In a color cinematographic camera, a lens; a plane mirror extending into the path of light rays transmitted by the lens and occupying a plane at an angle to the axis of said lens, said mirror having at least one sector-shaped light-passing opening; film gates arranged to support negative films, one in position for exposure to light rays reflected by the mirror and another in position for exposure to light rays transmitted by the mirror; color-filters for the films; a shutter adapted to permit light from the lens to reach both said films at each period of rest and while both are simultaneously at rest; means for revolving the mirror in its own plane whereby light rays from the lens are alternately reflected and transmitted by the mirror; means for actuating the mirror revolving means and the shutter; and means for feeding the films through the film gates step by step while the shutter is closed.

5. In a color cinematographic camera, a lens; a plane mirror extending into the path of light rays transmitted by the lens, occupying a plane at an angle to the axis of said lens and having at least one light-passing opening, the mirror being mounted to revolve in its own plane on a stationary axis whereby light rays from the lens are alternately reflected and transmitted by the mirror; film gates arranged to support negative films, one in position for exposure to light rays reflected by the mirror and another in position for exposure to light rays transmitted by the mirror; color filters for the films; means for feeding the films through said film gates step by step; a shutter adapted to permit light from the lens to reach both said films at each period of rest and while both are simultaneously at rest; means for actuating the shutter and the film-feeding means in harmony with each other; and means for revolving the mirror at a rate giving a plurality of reflections to one image area on one film and a plurality of transmissions to one image area on the other film in each cycle of operation of the camera.

6. In a color cinematographic camera, a lens; a rotatable plane mirror extending into the path of light rays transmitted by the lens, occupying a plane at an angle to the axis of said lens and having a plurality of radially extending reflecting portions and a plurality of intermediate light-passing openings; the mirror being mounted to revolve in its own plane on a stationary axis whereby light rays from the lens are alternately reflected and transmitted by the mirror; film gates arranged to support negative films, one in position for exposure to light rays reflected by the mirror and another in position for exposure to light rays transmitted by the mirror; color filters for the films; means for feeding the films through said film gates step by step; a shutter adapted to permit light from the lens to reach both said films at each period of rest and while both are simultaneously at rest; means for actuating the shutter and the film-feeding means in harmony with each other; and means for revolving the mirror in harmony with the film-feeding means and at a rate giving a plurality of reflections to one image area on one of said films and a plurality of transmissions to one image area on the other in each cycle of operation of the camera.

7. In a color cinematographic camera, a lens; a plane mirror extending into the path of light rays transmitted by the lens, occupying a plane at an angle to the axis of said lens and having at least one light passing opening, the mirror being mounted to revolve in its own plane on a stationary axis whereby light rays from the lens are alternately reflected and transmitted by the mirror for the formation of images in different positions; a shutter operating to open and close the lens alternately; color filters in the paths of the reflected and transmitted rays; and means for revolving the mirror at a rate giving a plurality of reflections to one image area and a plurality of transmissions to another image area in each open period of the lens.

8. In a color cinematographic camera, a lens; a plane mirror extending into the path of light rays transmitted by the lens, occupying a plane at an angle to the axis of the lens and having a plurality of radially extending reflecting portions and a plurality of intermediate light passing openings, the mirror being mounted to revolve in its own plane on a stationary axis whereby light rays from the lens are alternately reflected and transmitted by the mirror for the formation of images in different positions; a shutter operating to open and close the lens alternately; color filters in the paths of the reflected and transmitted rays; and means for revolving the mirror at a rate giving a plurality of reflections to one image area and a plurality of transmissions to another image area in each open period of the lens.

9. In a color cinematographic camera, the combination of a lens, film-gates at an angle to each other in rear of the lens to support negative films at an angle to each other in position for exposure, a plane mirror extending into the path of light rays emerging from the lens and rotatable in its own plane at an angle to the axis of the lens, said mirror having a plurality of light-passing openings to transmit light to one of said films and a plurality of intermediate reflecting portions to reflect light to another of the films; means for feeding the films through the film-gates step by step, a shutter for exposing both films at each period of rest thereof while both are at rest, means for actuating the shutter and the film-feeding means in harmony with each other, and means for rotating the mirror in harmony with the shutter and the film-feeding means and at a speed giving a plurality of transmissions to one image area on one film and a plurality of reflections to one image area on the other in each cycle of operation of the camera.

In testimony whereof I hereto affix my signature.

PERCY D. BREWSTER.